(12) United States Patent
Murray et al.

(10) Patent No.: US 7,519,137 B2
(45) Date of Patent: Apr. 14, 2009

(54) TIMING RECOVERY IN DATA COMMUNICATION CIRCUITS

(75) Inventors: Carl Damien Murray, Dublin (IE); Philip Curran, Dublin (IE); Alberto Molina Navarro, Madrid (ES)

(73) Assignee: Agere Systems, Inc., Allentown, PA (US)

( * ) Notice: Subject to any disclaimer, the term of this patent is extended or adjusted under 35 U.S.C. 154(b) by 768 days.

(21) Appl. No.: 10/207,883

(22) Filed: Jul. 31, 2002

(65) Prior Publication Data

US 2003/0026369 A1 Feb. 6, 2003

Related U.S. Application Data

(60) Provisional application No. 60/309,164, filed on Aug. 2, 2001.

(51) Int. Cl.
*H04L 7/00* (2006.01)

(52) U.S. Cl. .................. 375/355; 375/229; 375/233; 375/376

(58) Field of Classification Search ......... 375/229–234, 375/326–328, 362, 142, 147, 150, 219, 354–356, 375/371, 373, 376, 324, 339–340, 364, 365, 375/366, 368, 370, 375, 347–348; 370/350, 370/314, 321; 329/304, 306, 307; 725/127
See application file for complete search history.

(56) References Cited

U.S. PATENT DOCUMENTS

| | | | | |
|---|---|---|---|---|
| 5,359,631 A * | 10/1994 | Behrens et al. | ............. | 375/376 |
| 5,604,541 A * | 2/1997 | Kim et al. | ................. | 348/426.1 |
| 5,909,332 A * | 6/1999 | Spurbeck et al. | .............. | 360/51 |
| 6,067,319 A * | 5/2000 | Copeland | ..................... | 375/232 |
| 6,128,357 A * | 10/2000 | Lu et al. | ..................... | 375/355 |
| 6,144,513 A * | 11/2000 | Reed et al. | ..................... | 360/51 |
| 6,160,571 A * | 12/2000 | Wang | .......................... | 725/127 |
| 6,246,723 B1 * | 6/2001 | Bliss et al. | ................... | 375/265 |
| 6,310,926 B1 * | 10/2001 | Tore | ........................... | 375/355 |
| 6,313,961 B1 * | 11/2001 | Armstrong et al. | ............ | 360/46 |
| 6,359,878 B1 * | 3/2002 | Lakkis et al. | ................ | 370/350 |
| 6,590,872 B1 * | 7/2003 | Shiue et al. | .................. | 370/314 |

(Continued)

FOREIGN PATENT DOCUMENTS

WO   WO00/65772   11/2000

OTHER PUBLICATIONS

F.M. Gardner, "A BPSK/QPSK Timing-Error Detector for Sampled Receivers", 1986 IEEE Trans. on Comm. pp. 423-429.*

(Continued)

*Primary Examiner*—Chieh M. Fan
*Assistant Examiner*—Freshteh N. Aghdam

(57) ABSTRACT

In a 1000 BASE-T transceiver, a timing error detector (TED, 5) receives its inputs directly from the output of an ADC (2) and from a decision device (4). Timing recovery is acquired in three stages: a non-decision directed (NDD) stage during which only the output of an ADC (2) are used for acquisition; a stage for acquiring the remote scrambler and predicting symbols; and a decision-directed (DD) stage during which locally predicted symbols are also used for acquisition. Because the timing error detector (TED, 5) does not take inputs from the FFE (3) there is no information about cable length, and so an input of gain from an AGC is used to indicate cable length.

9 Claims, 4 Drawing Sheets

U.S. PATENT DOCUMENTS

| | | | |
|---|---|---|---|
| 6,842,495 B1 * | 1/2005 | Jaffe et al. | 375/326 |
| 2002/0131536 A1 * | 9/2002 | Veillette | 375/347 |
| 2002/0141495 A1 * | 10/2002 | Hatamian | 375/229 |

OTHER PUBLICATIONS

K.H. Mueller & M.Muller, "Timing Recovery in Digital Synchronous Data Receivers", IEEE Trans. on Comm., May 1976, pp. 516-530.*

Tom Napier, EDN Design Feature, Sep. 1, 1998, pp. 111-118, Flash ADC takes the uncertainty out of high-speed data recovery.

Patent Abstracts of Japan, vol. 1997, No. 9, Sep. 30, 1997, and JP 09 130443 A (Toshiba Corp), May 16, 1997.

G. Ungerboeck, IBM Technical Disclosure Bulletin, vol. 18, No. 3 pp. 769-771, Decision Directed Method for Timing Recovery . . . Aug. 1975.

* cited by examiner

TIMING RECOVERY IN DATA COMMUNICATION CIRCUITS

This is a complete application claiming benefit of provisional 60/309,164 filed Aug. 2, 2001.

FIELD OF THE INVENTION

The invention relates to timing recovery in data communication circuits such as those for 1000BASE-T ("Gigabit") communication.

PRIOR ART DISCUSSION

The 1000BASE-T system requires that each two-point link consist of one device configured as MASTER and another device configured as SLAVE. A startup procedure is specified in the IEEE standard and this dictates that the SLAVE must transmit its data at the exact same rate at which the MASTER is transmitting its data. Nominally the transmission rate of the MASTER will be 125 MHz, however in reality this rate will vary by some small amount, $\epsilon$ due to crystal oscillator variations arising from factors such as process and temperature variations. It is a function of the SLAVE to determine the value of $\epsilon$ from the incoming received signal and to ensure that it transmits to the MASTER at 125 MHz+$\epsilon$. This determination of $\epsilon$ is called timing recovery and is normally done using an implementation of a timing recovery algorithm. When the timing recovery algorithm involves the received symbols it is called decision directed (DD) timing recovery, otherwise it is called non-decision directed (NDD) timing recovery.

MASTER and SLAVE PHY status is determined during an auto-negotiation process that takes place prior to establishing the transmission link. The MASTER transmits at a fixed frequency determined by a crystal and runs its receiver at the exact same frequency. The SLAVE PHY recovers the MASTER clock from the received signal and uses it to determine the timing of receiver and transmitter operations.

FIG. 6A illustrates a two-phase timing recovery strategy.

In phase 1 only the MASTER PHY sends idle data into the link. No timing and no reliable decisions are available yet so the SLAVE PHY applies a Non-Decision Directed (NDD) algorithm to recover timing. Basically, the NDD algorithm recovers the frequency and phase of the MASTER clock by applying a non-linearity to the received signal taken from the ADC output. Once timing has been recovered the PHY proceeds with detection. An adaptive FFE performs equalization of the channel. After equalization is achieved, the symbol decisions are reliable at the output of the slicer and a scrambler (SCR) is fed with these symbols. Before entering phase 2, the scrambler is locked so that transmitted symbols can be generated in the SLAVE PHY independently of the decisions at the output of the slicer, and the PHY applies a Decision Directed (DD) algorithm to recover timing. NDD and DD algorithms differ in the non-linearities which they use to recover phase information. DD would typically choose a sampling phase which is different from that of NDD. Therefore, there is a strong possibility that the eye of the equalizer output will close when switching from NDD to DD timing recovery. This is not a problem since, at this point, the decisions are taken from the SCR.

In phase 2 the SLAVE PHY starts sending idle data into the link. Noise is added to the system due to the echo and NEXT signals. The FFE adapts to the new phase chosen by DD and to the new noise conditions. The adaptation process starts again with perfect timing recovered by the DD algorithm. Once symbol decisions are reliable at the output of the slicer the scrambler is switched off and timing then takes these decisions as input to the DD algorithm.

There are a number of known methods for timing recovery of baseband signals in a noisy environment. These methods differ in terms of their sampling strategy and configuration. The methods either involve asynchronous or synchronous sampling.

In synchronous sampling there is an oscillator which controls the sampler. The oscillator in this sampling scheme cannot be implemented digitally and parts of it are implemented in the analog domain. For this reason, synchronous sampling is a hybrid configuration. In asynchronous sampling, instead of a sampler which has to be controlled by analog means there is an interpolation filter which practically tries to do what a sampler is doing. Thus, all parts of the asynchronous sampling can be implemented digitally. This may be preferred in digital modems. However, a drawback of asynchronous sampling is that it needs dynamic buffers for the implementation of the interpolators, which may be problematic.

In terms of their configuration, timing recovery methods are classified into two categories: ones with feedback configuration and ones with feedforward configuration. In feedback configuration there is a feedback loop which feeds the information of the timing error into a decision block which tries to correct the error. In the feedforward configuration a signal for estimating the timing is calculated from the signal on the line. This previously obtained timing estimator signal is used in the timing corrector block.

The feedback configurations are separated into two according to their Timing Error Detector (TED) algorithms. The decision directed (DD) method relies on the data decisions available at the output of the detector. Thus, the TED of that method gets the data available at the detector output as its input. For that reason, the timing recovery configurations with decision directed methods depend highly on the performance of the detector. If the performance of the detector reduces for some reason the timing recovery performance also reduces. The non-data aided method, or non-decision directed (NDD) method, does not rely on the decisions at the detector output, and the TED tries to give a decision by using only the received signal from the cable. In order to separate the issue of timing recovery from the coding/decoding performance of the detector, one may prefer to use NDD methods. However, due to noise present in the system, especially the echo signal, NDD methods may not be sufficient to extract the timing information.

A typical timing recovery circuit is shown in FIG. 6B. The inputs are taken from the output of the FFE and the output of the decision device.

A disadvantage of this technique is that the input to the timing recovery circuit is a function of the FFE and hence interactions between the timing recovery algorithm and the FFE adaptation algorithm are possible.

Thus, the invention is directed towards providing improved timing recovery to overcome these problems.

SUMMARY OF THE INVENTION

According to the invention there is provided a timing recovery circuit for a data communication transceiver, the recovery circuit comprising a timing error detector (TED) providing an input to an oscillator via a loop filter, characterized in that, the timing error detector (TED) comprises means for performing both decision directed (DD) and non decision directed (NDD) recovery, and the TED is decoupled from a feed forward equalizer.

In one embodiment the circuit comprises means for providing an input to the TED solely from an analog to digital converter (ADC) for NDD recovery.

In one embodiment the circuit comprises means for providing an input to the TED (5) from both an analog to digital converter (ADC) and from a decision device for DD recovery.

In one embodiment the circuit comprises means for performing timing recovery in the following stages:
firstly a NDD stage in which the TED input is solely from the ADC,
a second stage for acquiring the remote scrambler and predicting symbols, and
a third, DD, stage during which the TED has inputs from both the ADC and from a decision device for locally predicting symbols.

In a further embodiment the circuit comprises means for switching to the third stage only when timing reaches an acceptable level, with the scramblers locked.

In one embodiment the ADC comprises means for oversampling during the first stage.

In another embodiment the over-sampling rate is twice the symbol rate.

In a further embodiment the circuit further comprises means for scaling output of the timing error detector by a varying correction factor based on cable length.

In one embodiment the correction factor is determined according to AGC gain value during start-up without echo or NEXT.

In another aspect the invention provides a data communications transceiver comprising a timing recovery circuit as defined above.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 6B:
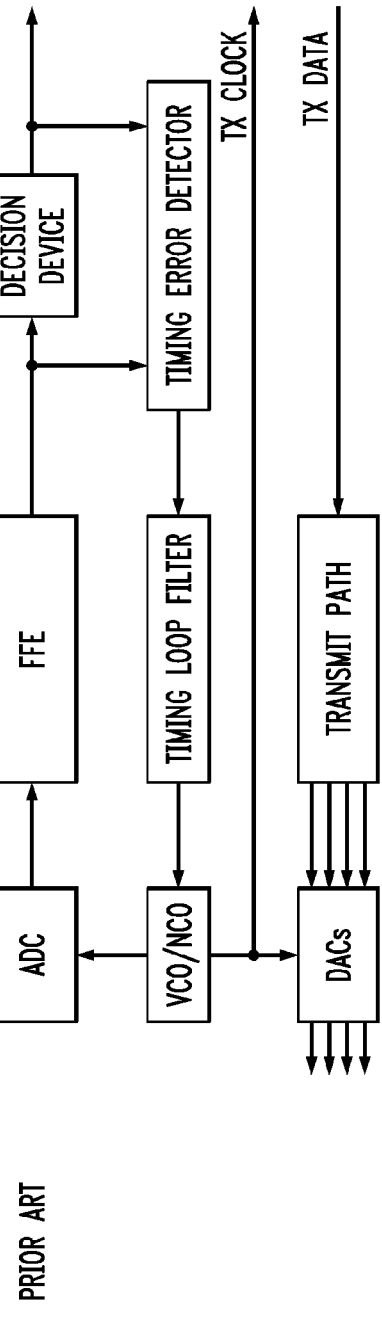
FIG. 6A-6B show a typical timing recovery strategy and circuit
Figure 1:
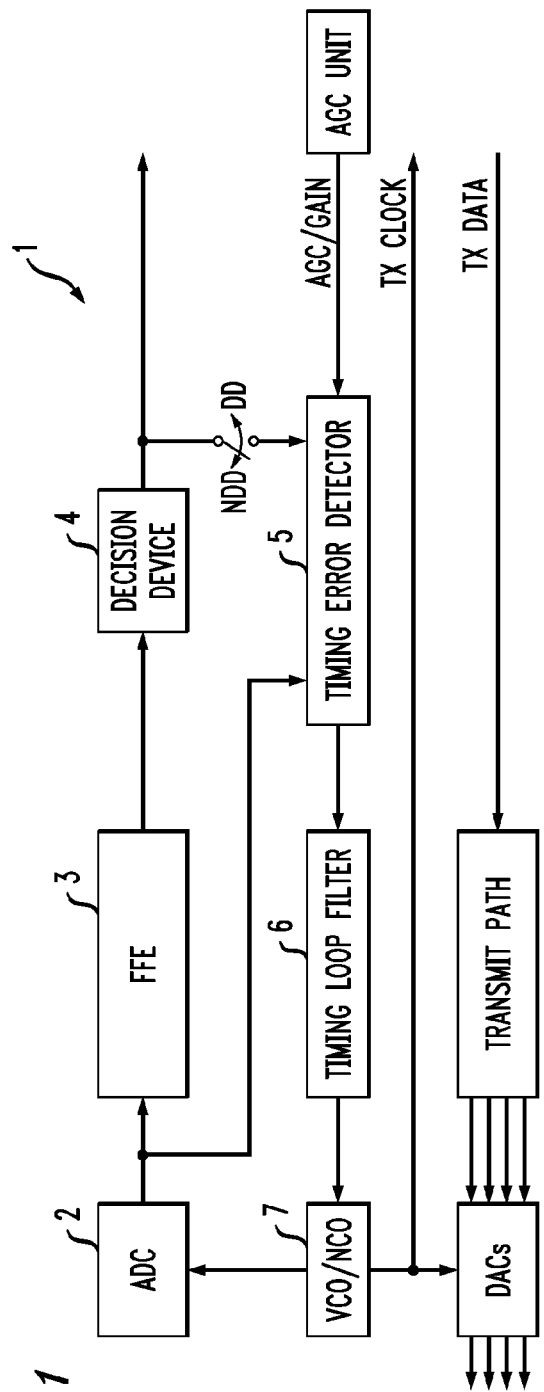
FIG. 1 is a diagram illustrating a timing recovery circuit of the invention.
Figure 2:
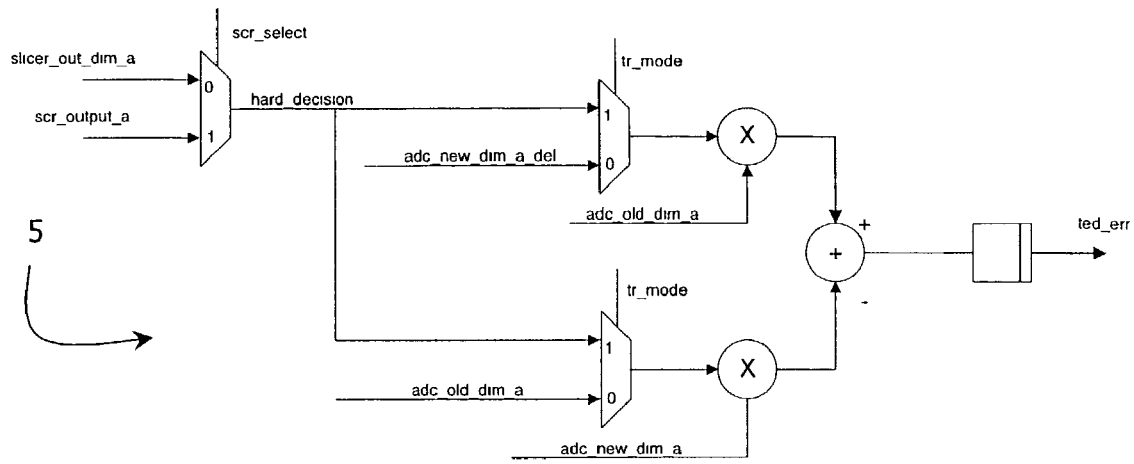
FIG. 2 is a more detailed diagram of a timing error detector of the circuit.
Figure 3:
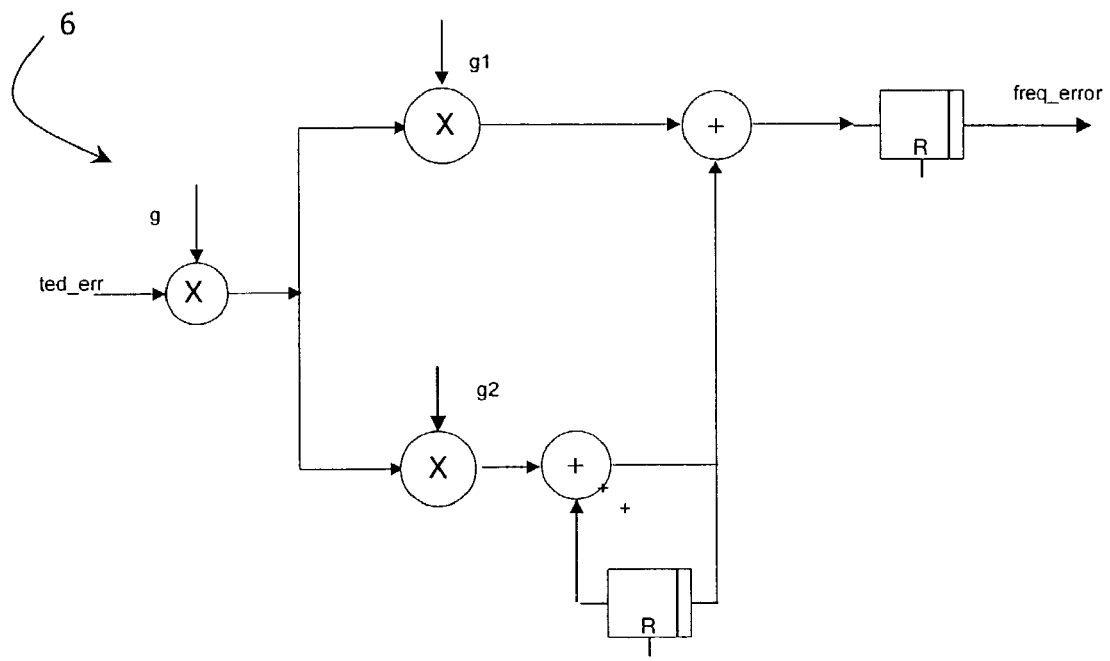
FIG. 3 is a more detailed diagram of a loop filter.

Referring to FIGS. 1 to 3 there is shown a timing recovery circuit 1 of the invention. The circuit comprises an ADC 2 connected to a FFE 3, in turn connected to a decision device 4. A timing error detector (TED) 5 has inputs from both the ADC 2 and the decision device 4 for DD recovery, and only from the ADC 2 for NDD recovery. Its output feeds a timing loop filter 6, in turn feeding a VCO 7. The TED 5 receives a gain value from the AGC. This is proportional to the length of the cable at startup of the circuit 1.

Thus, unstable operations arising from timing error detection being affected by equaliser coefficients are avoided, because timing and symbol detection processes are independent.

The NDD timing recovery circuitry is completely decoupled from the FFE because it takes its input solely from the output of the ADC 2. This input is fed through a nonlinearity (the TED) and the error generated is passed into a control loop which drives the Numerically Controlled Oscillator (NCO) which, in turn drives the ADC. The TED 5 does not require the FFE information indicating cable length as this is derived from the AGC gain value instead.

The DD timing recovery is also decoupled since its inputs are from the ADC 2 and the decision device 4 and the recovered symbols are independent of the properties of the FFE (provided the decision device is making good decisions about the symbols).

The NDD algorithm uses the Gardner non-linearity as the TED nonlinearity $$e_{NDD}(k)=y(kT-T/2)[y(kT)-y(kT-T)]$$

on the basis that the sampling rate at the ADC is twice the symbol rate. y(t) is the waveform at the input to the ADC, and T is the sampling period of the ADC. On the other hand, the DD algorithm uses the following non-linearity $$e_{DD}(k)=x(kT-\Delta)[y(kT)-y(kT-T/2)]$$

where $\Delta$ is the delay of the channel and x(t) is the transmitted symbol.

A disadvantage of using the ADC output rather than the FFE output is that the quality of the input to the TED will vary with the length of the cable. As the cable gets longer the useful timing information per sample decreases, even though the Automatic Gain Control (AGC) unit ensures the power of the sampled signal is a constant. This variation in useful information means that the error signal in the TED for a given phase offset will decrease with channel length. To avoid having a control loop with a varying gain, the circuit 1 corrects for this diminishing TED output by increasing the TED output by a varying factor called the "TED correction factor" (TCF). This TCF is selected based on the length of cable over which the PHY is operating. Fortunately this can be determined quite reliably using the AGC gain value during phase 1 of start-up as there is no echo or NEXT energy to confuse the issue. The AGC gain index is used to index a table of values for the TCF which ensures the overall performance of the TED does not vary with cable length.

Figure 4:
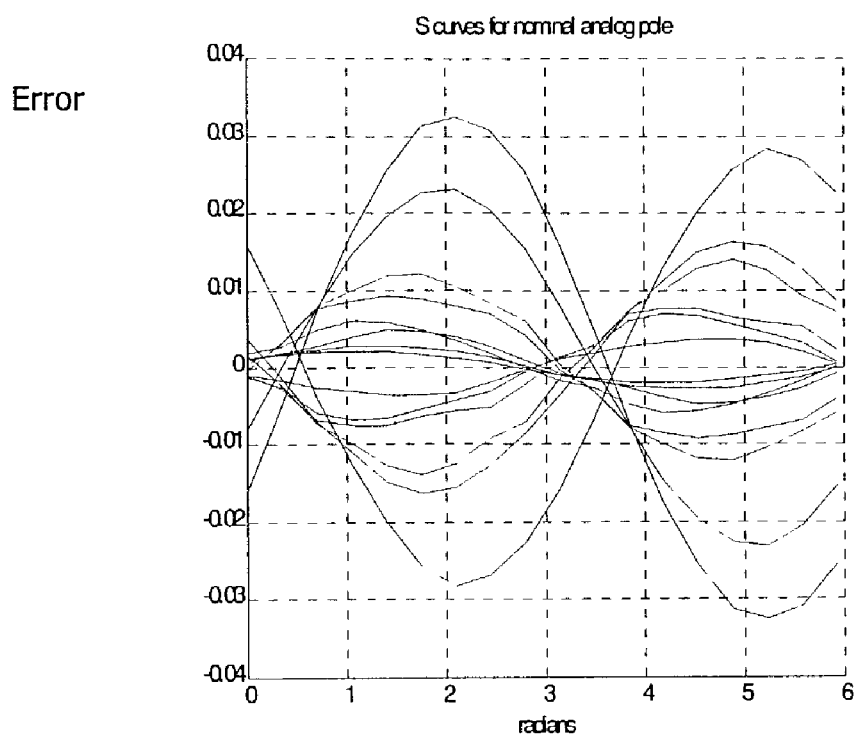
FIG. 4 is a set of plots showing uncompensated NDD TED output curves of the circuit.
Figure 5:
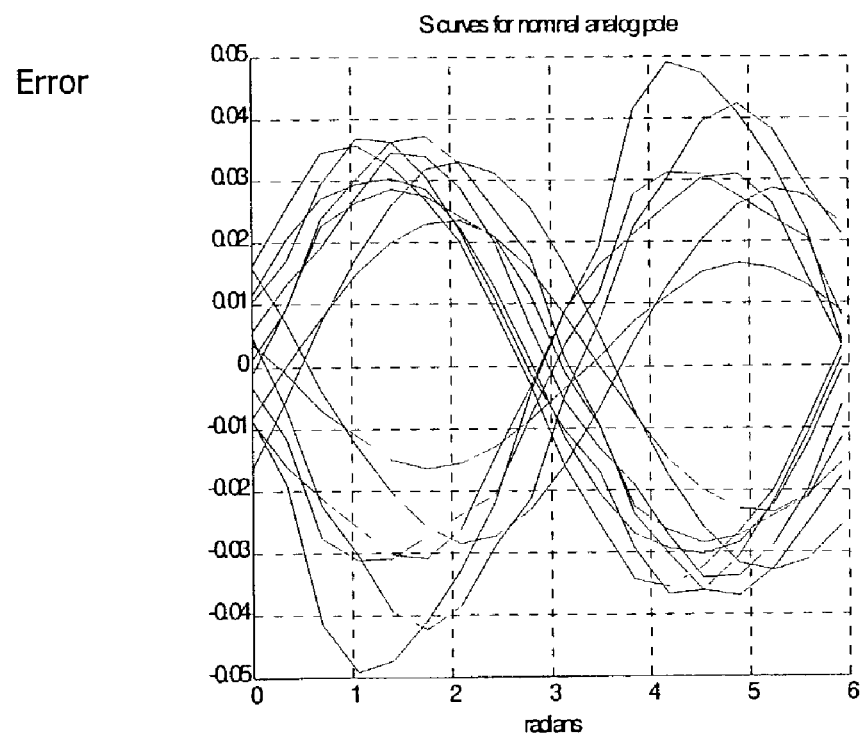
FIG. 5 is a set of plots showing compensated NDD TED curves for varying length cable.
Figure 6A:
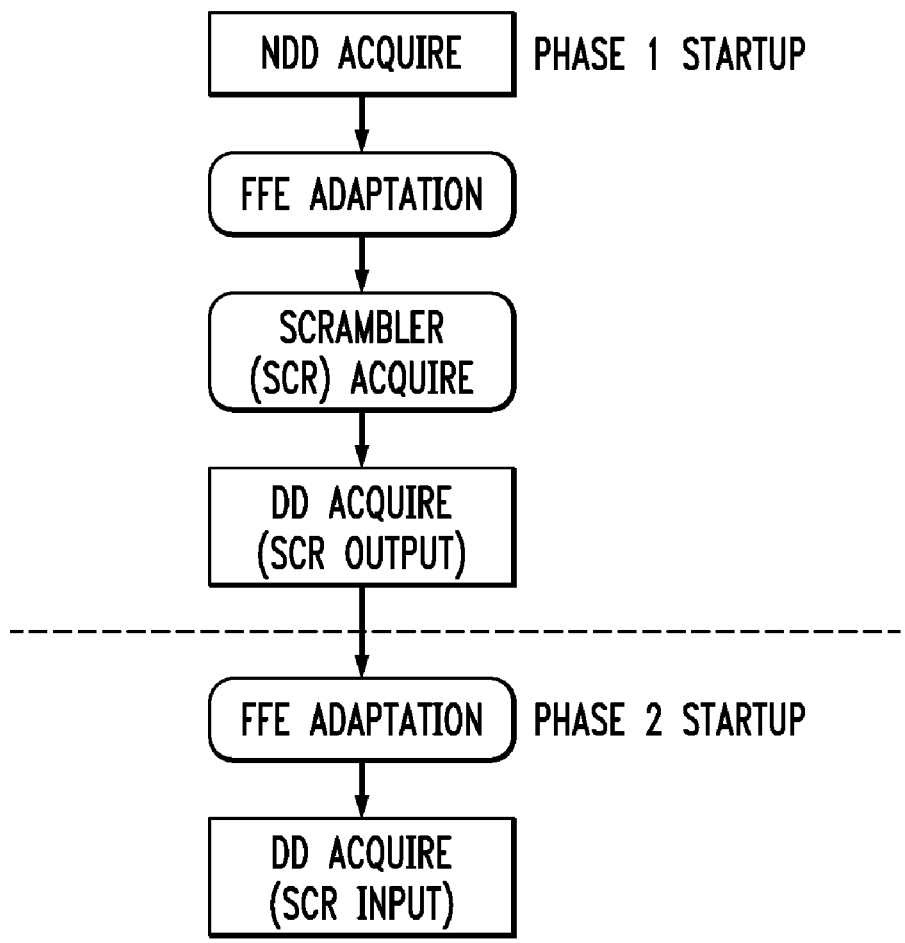

The uncompensated and compensated TED output curves are given in FIGS. 4 and 5. In FIG. 4 the lower-amplitude curves represent error for longer lengths. As shown in FIG. 5 the TED scales the error according to the TCF so that the operation is independent of length.

The Slave PHY acquires timing information in three stages under the control of the PMA controller i.e. there are three PMA control states specifically for timing acquisition. These are NDD_ACQUIRE, MSL_ACQUIRE and DD_ACQUIRE.

During NDD_ACQUIRE the Slave will attempt to acquire timing using a 'non decision directed' algorithm. This is because at this stage the decisions from the slicer are not reliable and so ADC data is used.

NDD_ACQUIRE will always appear to end successfully as there is no way of detecting failure at this point. Next the FFE on dimension A will adapt following which reliable decisions on dimension A will be available. These decisions will be used to acquire the remote scrambler during MSL_ACQUIRE. When the remote scrambler has been acquired the scrambler will be used to predict the symbols being transmitted by the Master and these symbols will be used during DD_ACQUIRE.

The operation of DD_ACQUIRE is very similar to that of NDD_ACQUIRE except that the locally predicted symbols are also used in acquisition.

The overall structure of the timing error detector is shown in FIG. 2 and that of the loop filter in FIG. 3. Referring to FIG. 2, The scrambler select signal (scr_select) determines whether the decision about the present symbol is taken from the slicer (slicer_out_dim_a) or the scrambler (scr_output_a) and this is then assigned to the hard_decision. As noted previously this hard decision is only used in DD mode which is indicated by the value of the signal tr_mode. If tr_mode is equal to 1 then we are in DD mode and the hard decision is used, otherwise we are in NDD mode and only the ADC outputs are used to generate the timing error signal (ted_err).

Referring to FIG. 3, the loop filter is a second order loop and thus consists of a proportional part with gain g1 and an integral part with gain g2. The input is the timing error (ted_err) and this is multiplied with a term g which factors in the TCF (TED Compensation Factor) derived from the AGC gain. The output of the loop filter (freq_error) is used to drive the NCO.

The invention is not limited to the embodiments described but may be varied in construction and detail.

The invention claimed is:

1. A timing recovery circuit for a data communication transceiver, the timing recovery circuit comprising:
  a timing error detector (TED) providing an input to an oscillator via a loop filter, said timing error detector (TED) configured to perform both decision directed (DD) and non decision directed (NDD) recovery;
  an analog to digital converter (ADC) connected directly to and upstream of said TED, said ADC providing an input to said TED during both NDD and DD recovery;
  a feed forward equalizer (FFE) also connected directly to said ADC and receiving an input from said ADC;
  the direct connection between said ADC and said TED being upstream of said FFE such that said TED and the input received by said TED from said ADC are not affected by said FFE, said ADC input being an only input to said TED for NDD recovery;
  a decision device connected to and downstream of said FFE, said decision device providing an input to said TED only for DD recovery such that, during DD recovery, said TED is configured to selectively receive both said ADC input and said decision device input; and
  a switching mechanism configured to connect and disconnect the output of said decision device from said TED for DD recovery and NDD recovery, respectively.

2. The timing recovery circuit as claimed in claim 1, wherein the timing recovery circuit is configured to perform timing recovery in the following stages:
  a NDD first stage in which the TED input is solely from the ADC,
  a second stage for acquiring the remote scrambler and predicting symbols, and
  a DD third stage during which the TED has inputs from both the ADC and from said decision device for locally predicting symbols.

3. A timing recovery circuit for a data communication transceiver, the timing recovery circuit comprising:
  a timing error detector (TED) providing an input to an oscillator via a loop filter, said timing error detector (TED) configured to perform both decision directed (DD) and non decision directed (NDD) recovery;
  an analog to digital converter (ADC) connected directly to and upstream of said TED, said ADC providing an input to said TED during both NDD and DD recovery;
  a feed forward equalizer (FFE) also connected directly to said ADC and receiving an input from said ADC;
  the direct connection between said ADC and said TED being upstream of said FFE such that said TED and the input received by said TED from said ADC are not affected by said FFE, said ADC input being an only input to said TED for NDD recovery;
  a decision device connected to and located downstream of said FFE, said decision device providing an input to said TED only for DD recovery such that, during DD recovery, said TED receives both said decision device input and said ADC input; and
  a switch that is configured to selectively connect the output of said decision device to said TED and to selectively disconnect said decision device output from said TED;
  wherein the timing recovery circuit is configured to perform timing recovery in the following stages:
  a NDD first stage in which the switch selectively disconnects the output of said decision device from said TED such that said TED is configured to receive input solely from the ADC,
  a second stage for acquiring a remote scrambler and predicting symbols, and
  a DD third stage during which the switch selectively connects the output of said decision device to the TED such that the TED is configured to receive inputs from both the ADC and from said decision device for locally predicting symbols; and
  wherein the timing recovery circuit is configured to selectively connect the output of said decision device as an input to the TED for the third stage only when timing reaches an acceptable level, with the scrambler locked.

4. The timing recovery circuit as claimed in claim 2, wherein the ADC is configured to perform over-sampling during the first stage.

5. The timing recovery circuit as claimed in claim 4, wherein the over-sampling rate is twice the symbol rate.

6. The timing recovery circuit as claimed in claim 1, wherein the timing recovery circuit scales output of the timing error detector by a varying correction factor based on cable length.

7. The timing recovery circuit as claimed in claim 6, wherein the correction factor is determined according to AGC gain value during start-up without echo or NEXT.

8. A data communication transceiver comprising a timing recovery circuit as claimed in claim 1.

9. The timing recovery circuit as claimed in claim 1, wherein said TED is also connected to an Automatic Gain Control (AGC) unit and receives a gain value directly from said AGC unit.

* * * * *